United States Patent [19]

Ohashi

[11] Patent Number: 4,525,050
[45] Date of Patent: Jun. 25, 1985

[54] PHOTOGRAPHIC CAMERA WITH BUILT-IN OPTICAL CONVERTER

[75] Inventor: Saichiro Ohashi, Kyoto, Japan

[73] Assignee: Fuji Photo Film Co., Ltd., Kanagawa, Japan

[21] Appl. No.: 468,838

[22] Filed: Feb. 23, 1983

[30] Foreign Application Priority Data

Feb. 24, 1982 [JP] Japan .................................. 57-29572

[51] Int. Cl.³ .............................................. G03B 3/00
[52] U.S. Cl. .............................................. 354/195.12
[58] Field of Search ........................ 354/195.1, 195.12; 352/142

[56] References Cited

U.S. PATENT DOCUMENTS 4,214,829  7/1980  Ohashi ............................ 354/195.12

Primary Examiner—John Gonzales
Attorney, Agent, or Firm—Sughrue, Mion, Zinn, Macpeak and Seas

[57] ABSTRACT

A photographic camera comprising a principal lens assembly and a converter lens assembly for providing a focal length different from that of the principal lens assembly when used. The converter lens assembly is carried by an intermediate barrel for the support of the principal lens assembly through a lens mount such that the converter assembly can move together with the principal lens assembly. A switching mechanism is also used for selectively bringing the converter lens assembly into and out of alignment with the optical axis of the principal lens assembly.

5 Claims, 6 Drawing Figures

PHOTOGRAPHIC CAMERA WITH BUILT-IN OPTICAL CONVERTER

BACKGROUND OF THE INVENTION

The present invention relates to a photographic camera having a built-in optical converter.

The photographic camera equipped with a built-in optical converter separately of the standard or main objective lens is well known to those skilled in the art. In this known photographic camera, the built-in optical converter generally serves to transmit a spatial image, formed by the standard lens, of a target object to be photographed, to a photographic film on a scale different from that of the image projected onto the film solely by the standard lens, for example, on a magnified scale, when such built-in optical converter is brought into alignment with the optical axis of the standard lens. So far as magnification is involved, this optical converter is generally referred to as a telephoto converter.

The U.S. Pat. No. 4,214,829 issued to Saichiro Ohashi, the inventor of the present invention, discloses a rangefinder camera of a type wherein the optical converter, for example, the telephoto converter is carried behind the standard lens for pivotal movement into and out of alignment with the optical axis of the standard lens. The switching mechanism employed therein is concurrently constituted by the focusing ring manipulatable to bring a target object to be photographed into focus. For enabling the telephoto converter to be selectively brought into and out of alignment with the standard lens, the focusing ring is made to rotate through spaced first and second predetermined focusing angles such that, when and so long as the focusing ring is rotated through the first focusing angle, the converter is held in position out of alignment with the standard lens, but when and so long as it is rotated through the second focusing angle, the converter is held in position in alignment with the standard lens. The converter is carried by the camera body behind the standard lens assembly by means of a support arm having a cam follower. The cam follower, for example, the roller element, protrudes through the front wall of the camera body into the standard lens assembly and terminates in engagement with a substantially eccentric cam ring rotatable together with the focusing ring while a biasing spring is also used to urge the converter towards the position out of alignment with the standard lens. The cam ring is so shaped that only when the focusing ring overrides from the capability of being moved through the first focusing angle onto the capability of being moved through the second focusing ring, the converter can be brought to the position in alignment with the standard lens by the action of the biasing spring. The standard lens is, when the converter is brought into alignment therewith, shifted a distance frontwardly of the camera from the position occupied when the converter is out of alignment therewith, thereby to compensate for change in optical system as a whole.

The rangefinder camera disclosed in the above mentioned patent is successful and effective in substantially eliminating such time-consuming and/or complicated handling procedure as the necessity of manipulating separately the focusing ring and an additional manipulatable element specifically designed for selectively bringing the converter into and out of alignment with the standard lens. However, the prior art rangefinder camera still has some problems to be solved.

By way of example, since as the converter is brought into alignment with the standard lens pivoting in the fixed plane perpendicular to the optical axis, the standard lens is shifted frontwardly of the camera thereby to separate a relatively large distance from the converter. While the frontward shift of the standard lens is necessitated to compensate for change in design of the optical system as a whole, the presence of the relatively large space between the standard lens and the converter not only makes the camera bulky, but also make it difficult to design the optical system as a whole capable of achieving a desired magnification. The increased size of the lens assembly may be minimized by carefully selecting the design of the optical system as a whole, but the lens assembly would be heavy and expensive, or the lens assembly would be susceptible to the enhanced optical aberration and/or the reduced resolution. This is also true even where the design is made to achieve the intended magnification.

In addition, the provision of the first and second angles through which the focusing ring is rotatable means that a "re-focusing" manipulation is required. That is, when a photographer while moving the focusing ring through the first focusing angle for focus adjustment has decided to use the converter and then switches the converter into alignment with the standard lens, he or she has to recommence the focus adjustment by turning the focusing ring through the second focusing angle. The consequence is that, with the prior art camera disclosed in the above mentioned U.S. Patent, the photographer may lose a decisive shutter change.

SUMMARY OF THE INVENTION

Accordingly, the present invention has been developed to substantially eliminate the above described inconveniences and disadvantages inherent in the prior art photographic camera of a type having the optical converter positioned rearwardly of the principal lens and capable of being selectively brought into and out of alignment with the optical axis of the principal objective lens and, has for its essential object to provide an improved photographic camera wherein the converter lens is carried by the principal lens assembly for movement together therewith in a direction parallel to the optical axis and also for pivotal movement independently of the principal lens assembly.

Another important object of the present invention is to provide an improved camera of the type referred to above, wherein the switching of the converter selectively into and out of alignment with the principal lens can be carried out by means of either or both of an electric motor drive and a manipulatable switching element, for example, a manipulatable switching ring or lever provided separately of the focusing ring.

A further object of the present invention is to provide an improved camera of the type referred to above, which is easy to handle and can be manufactured in a compact size without unreasonably increasing the manufacturing cost.

According to the present invention, there is provided a photographic camera comprising, in combination: a camera body including a front wall having an opening therein at a position opposed to a focal plane within the camera body where a photosensitive film, when loaded in the camera, is positioned, and an objective lens assembly including an objective lens means providing a principal optical system of a first predetermined focal length and a lens mount means for supporting the objective lens means in alignment with the opening in the front wall of the camera body. A converter lens means is carried by the lens mount means for movement together therewith in a direction parallel to the optical axis of the lens assembly. The camera also comprises means for shifting the lens mount means in a direction parallel to the optical axis between a first mode position where the converter lens means is out of alignment with the objective lens assembly and a second mode position where the converter lens is aligned with the objective lens assembly, and means operatively engaging said shifting means for selectively switching the converter lens means into and out of alignment with the objective lens means when the objective lens assembly is shifted to the second and first positions, respectively.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
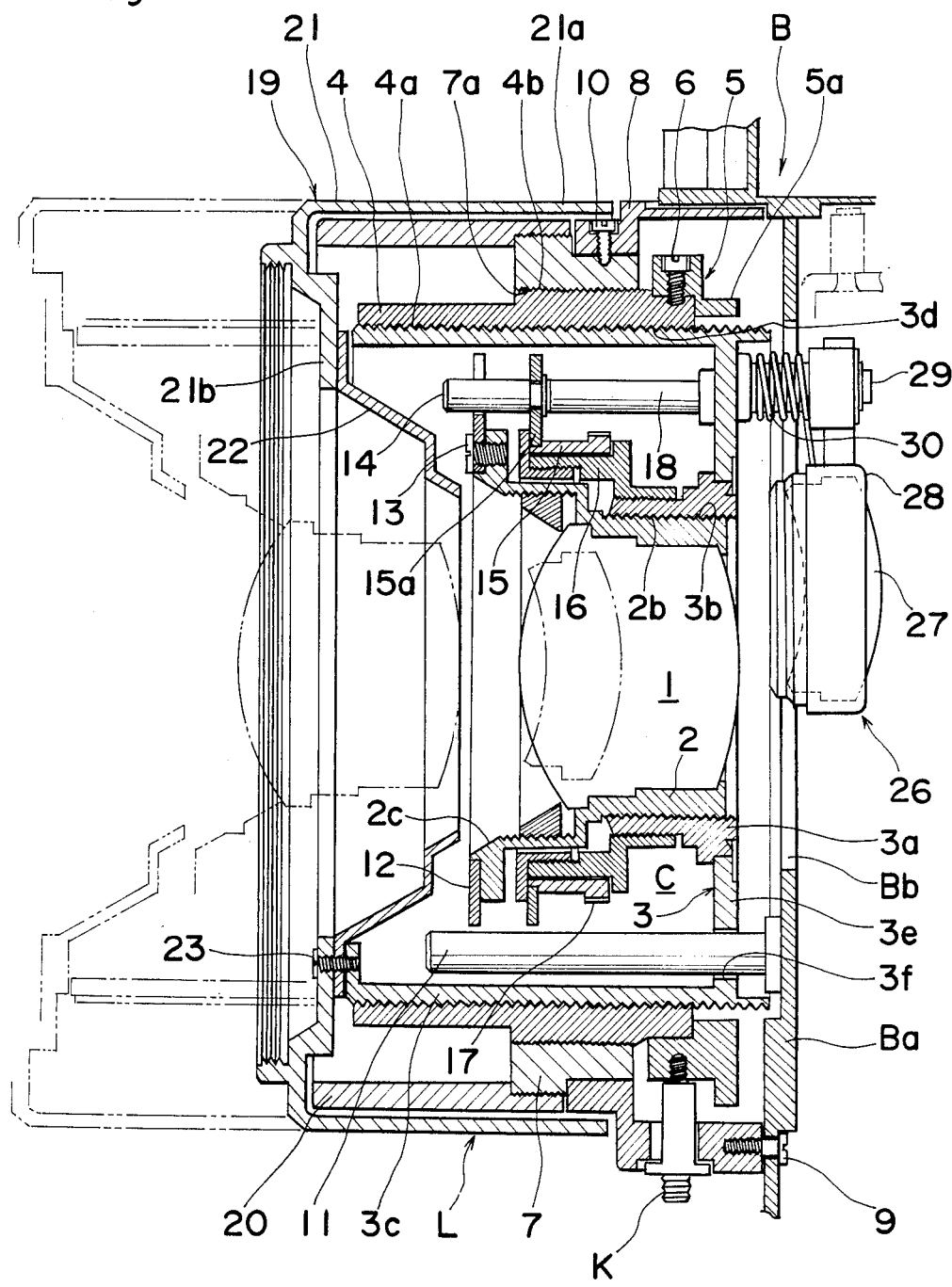
FIG. 1 is a longitudinal sectional view of an objective lens assembly secured to the body of a camera, with an optical converter held in an inoperative position.

Before the description of the present invention proceeds, it is to be noted that like parts are designated by like reference numerals throughout the accompanying drawings.

Referring first to FIG. 1, a photographic camera comprises a camera body B, including a front wall Ba having an opening Bb defined therein frontwardly of a photographic film (not shown) and rearwardly of a standard objective lens assembly L. The objective lens assembly L is mounted to the camera body B in a manner as will be described later in alignment with the opening Bb and comprises an objective lens 1 which may be constituted by one or more lens elements or one or more groups of lens elements as is well known to those skilled in the art.

The objective lens assembly L comprises a lens mount 2 for supporting the objective lens 1 fixedly therein, and an intermediate barrel 3. The intermediate barrel 3 is comprised of an inner barrel portion 3a with an internal helicoid thread 3b defined on the inner peripheral surface thereof and engaged with an external helicoid thread 2a defined on the outer peripheral surface of the lens mount 2, an outer barrel portion 3c with an external helicoid thread 3d defined on the outer surface thereof, and an annular flange 3e radially extending between the respective rear ends of the inner and outer barrel portions 3a and 3d to fixedly connect them together with an annular space C defined therebetween.

The objective lens assembly L further comprises an actuating barrel 4 having an internal helicoid thread 4a and carrying the intermediate barrel 3 therein with the internal helicoid thread 4a meshed with the external helicoid thread 3d on the outer barrel portion 3c, a cam ring 5 fixedly mounted on the rear end of the actuating barrel 4 by means of one or more screws 6, a ring-shaped carrier 7 having an internal helicoid thread 7a meshed with an outer helicoid thread 4b defined on the outer peripheral surface of the actuating barrel 4, and a support barrel 8 fixed to the front wall Ba of the camera body B at the rear end thereof by means of a plurality of screws (only one of which is shown by 9) and supporting therein the carrier 7 fixedly by means of one or more screws 10 at the front end portion thereof.

In order to guide the intermediate barrel 3 in a direction parallel to the optical axis of the objective lens without causing a rotation thereof, there is provided a guide rod 11 which is fixed at its rear end to the front wall Ba and extends frontwardly therefrom into the annular space C through a hole 3f in the annular flange 3e in parallel to the optical axis. The barrels 3 and 4, the carrier 7 and the guide rod 11 constitute a motion translator for translating a rotary motion of the cam ring 5 into a linear motion of the objective lens 1. Namely, when the cam ring 5 is rotated a predetermined angle, the barrel 4 rotates together with the cam ring 5 about the optical axis, the rotation of said barrel 4 being transmitted to the intermediate barrel 3 through the engagement between the helicoid threads 4a and 3a. Since the barrel 3 is supported only for axial movement guided by the guide rod 11, the rotation of the actuating barrel 4 causes the intermediate barrel 3 to move axially together with the lens mount 2, resulting in the axial shift of the objective lens from standard mode position, shown by the solid line in FIG. 1, to a telephoto mode position shown by the broken line or from the telephoto mode position to the standard mode position depending on the direction of rotation of the cam ring 5.

The requisite rotation of the cam ring 5 may be effected by means of a motor drive having a drive gear (not shown) meshed with a marginal portion of the periphery of the cam ring 5, but so far illustrated, it can be effected by turning a knob K about the support barrel 8, through a predetermined angle. It is, however, to be noted that, because of the provision of helicoid threads 4b and 7a meshed to each other, the rotation of the cam ring 5 results in axial movement of the actuating barrel 4 relative to the carrier 7. Preferably, the distance over which the barrel 4 is axially moved while being rotated together with the cam ring 5 is very small, and this can be accomplished by designing the helicoid threads 4a and 7a having a small pitch between the respective teeth. Alternatively, depending on the design of the optical system, any suitable pin and groove engagement may be employed so that only the axial movement of the barrel 4 will take place even if the cam ring 5 is rotated. However, the use of the thread engagement such as described and shown is advantageous in that the actuating barrel 4 can steadily be supported with no slightest wobbling which would result in undesirable displacement of the optical axis of the lens 1.

For the purpose of focus adjustment, a focus adjusting ring 12 is fixed to the lens mount 2 through an annular extention 2c integral with the lens mount 2 by means of one or more screws 13. A drive rod 14 having one end secured to an annular plate 15a is operatively coupled to the focus adjusting ring 12 for turning the ring 12 and, hence, the lens mount 2 as the annular plate 15a is turned about the optical axis in a manner as will subsequently described. A drive sleeve 15 having the annular plate 15a mounted thereon for rotation together therewith is rotatably mounted on a mounting barrel 16 which is in turn fixedly mounted on the outer periphery of the inner barrel portion 3a. The drive ring 15 also has gear teeth 17 defined on one end of the sleeve 15 opposite to the annular plate 15a, which teeth 17 are in turn meshed with a drive gear (not shown) forming a part of any known motor operated auto-focus control unit. Thus, it will readily be seen that, as the annular plate 15a rotates together with the sleeve 15, the drive rod 14 undergoes an angular movement about the optical axis, causing the focus adjusting ring 12 and, hence, the lens mount 2 to rotate about the optical axis. During the rotation of the lens mount so effected, the lens mount 2 is threadingly moved in the axial direction while rotating relative to the inner barrel portion 3a of the intermediate barrel 3 for the focus adjustment.

Reference numeral 18 represents a positioning rod for defining the position to which the mounting barrel 16 should be threading by mounted on the inner barrel portion 3a, and therefore, defining one of the focusing positions, for example, the infinity position at which the target object located an infinite distance away from the camera can be focused on the film (not shown). However, this positioning rod 18 may not be always necessary.

The assembly so far described is substantially concealed within and made up by a cover means 19 comprising a cylindrical inner cover 20 fixedly mounted on the ring-shaped carrier 7 and protruding frontwardly therefrom in a direction away from the support barrel 8, an outer cover 21 having a cylindrical portion 21a completely encircling the inner cover 20 and also having a radially inwardly extending flange 21b covering the front of the objective lens 1, and a generally conical front cover 22 extending from the flange 21b in a direction inwardly of the lens assembly L, said outer cover 21 and said front cover 22 being secured to the front end of the outer barrel portion 3c of the intermediate barrel 3 by means of a plurality of set screws 23 (only one of them being shown) for movement together with said barrel 3.

Figure 2:
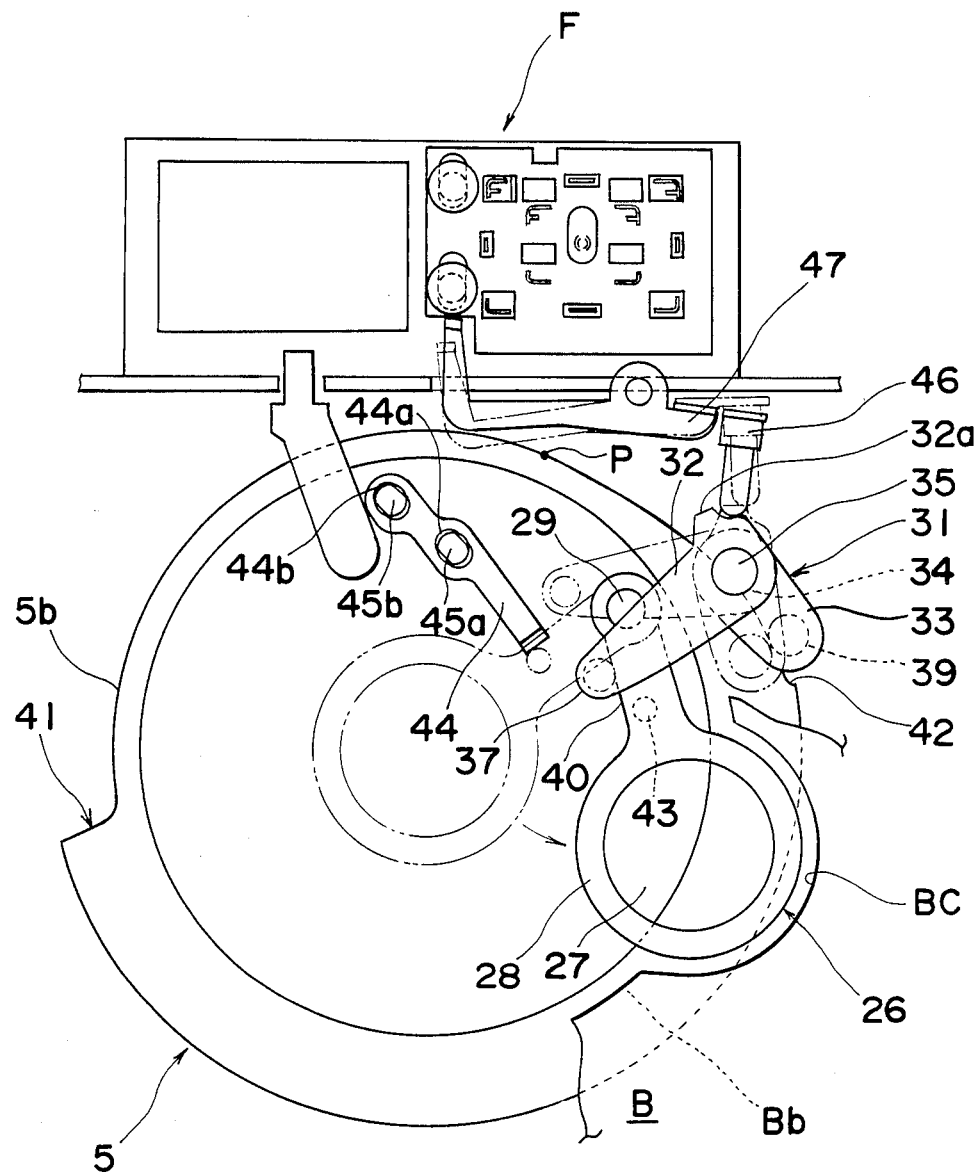
FIG. 2 is an elevational view of showing a switching mechanism for the converter lens generally as viewed in a leftward direction of FIG. 1.
Figure 3:
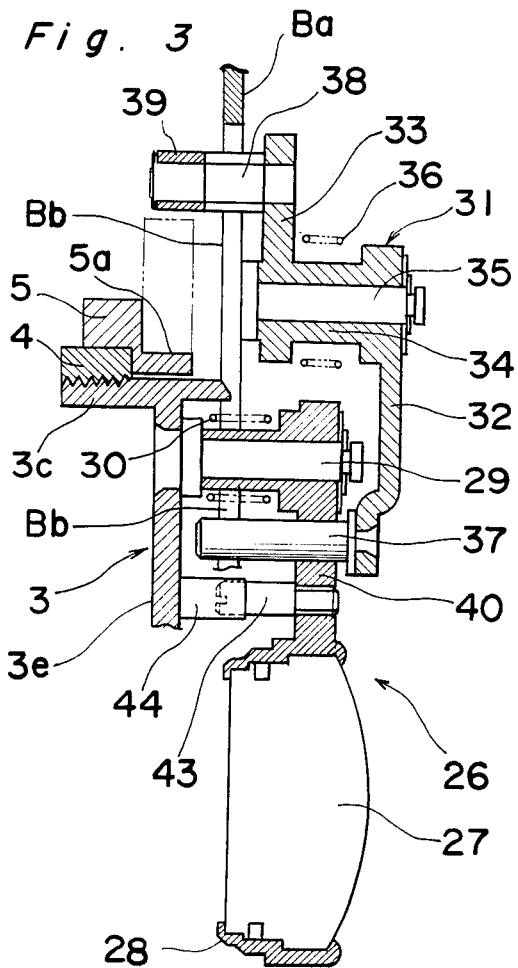
FIG. 3 is a longitudinal sectional view showing the switching mechanism in relation to a cam ring incorporated in the lens assembly of FIG. 1.
Figure 6:
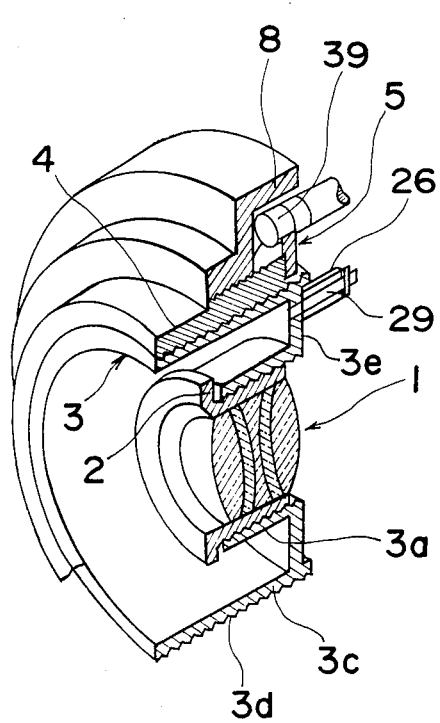
FIG. 6 is a schematic perspective view of the objective lens assembly shown as cut into halves along a plane parallel to the optical axis.

As shown in FIGS. 1 to 3, a converter lens assembly 26 is carried behind the objective lens 1 by the intermediate barrel 3. This converter lens assembly 26 comprises a converter lens 27; a holder 28 for supporting the converter lens 27; a pivot pin 29 rigidly secured to the annular flange 3e and extending therefrom into the camera body B through the opening Bb for the support of the holder means 28 thereon; and a torsion spring 30. The holder 28 is pivotally mounted on the free end of the pivot pin 29 for pivotal movement between an inoperative position, in which the converter lens 27 is out of alignment with the optical axis of the objective lens 1, and an operative position, in which the converter lens 27 is in alignment with the optical axis of the objective lens 1, and is normally urged by the torsion spring 30 as as to assume the operative position.

Referring to FIGS. 2 and 3, a switching mechanism 31 for the converter lens assembly 26 will now be described.

The switching mechanism 31 is so constructed as to cooperate with the cam ring 5 fixed to the actuating barrel 4. This switching mechanism 31 comprises, as best shown in FIGS. 2 and 3, a rocker arm 32 and a carrier arm 33 integrally formed, or rigidly connected together, with each other by means of a bearing sleeve 34 which is rotatably mounted on a carrier rod 35 secured to the front wall Ba of the camera body B and protruding into the interior of the camera body B. The switching mechanism 31 is pivotable about the carrier rod 35 between retracted and release positions and is normally biased so as to assume the release position by a biasing spring 36 which may be a torsion spring or a wire spring having its opposite ends engaged to the front wall Ba and the switching mechanism 31 in any suitable manner. One end of the rocker arm 32 remote from the bearing sleeve 34 has an engagement pin 37 rigidly secured thereto and protruding through the opening B in parallel to the optical axis with its free end spaced a distance from the annular flange 3e of the intermediate barrel 3, the function of said engagement pin 37 being described later. Similarly, one end of the carrier arm 33 remote from the bearing sleeve 34 has a bearing pin 38 rigidly secured thereto and protruding through the opening Bb in a direction parallel to the optical axis, said bearing pin 38 having a cam follower roller 39 rotatably mounted thereon. As best shown in FIG. 2, the rocker arm 32 and the carrier arm 33 are circumferentially offset relative to the bearing sleeve 34 such that they are angularly spaced a predetermined acute angle, for example, 90°, from each other about the longitudinal axis of the bearing sleeve 34.

Figure 4:
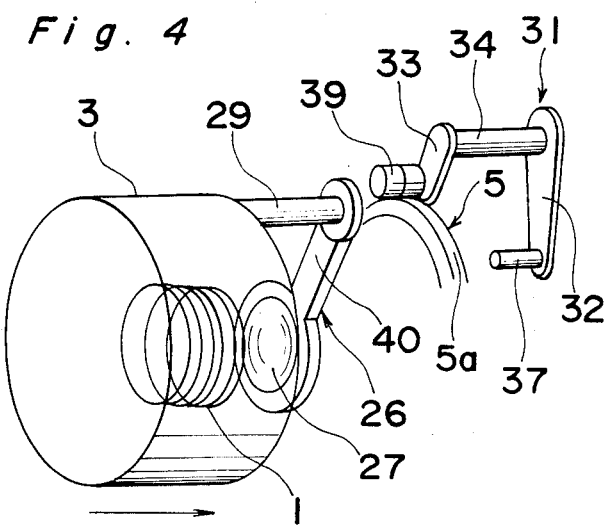
FIG. 4 and FIG. 5 are schematic perspective views showing the switching mechanism in different operative positions.
Figure 5:
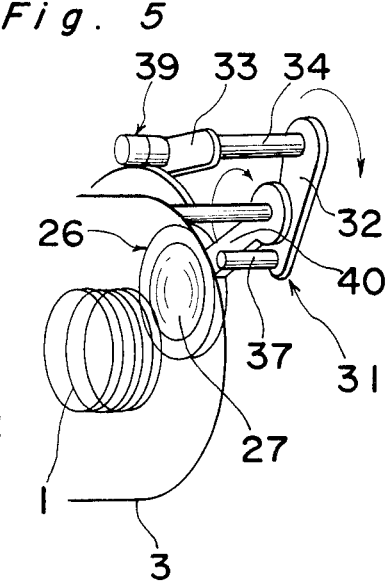

In the construction so far described, the switching mechanism 31 operates in such a manner that, when and so long as the switching mechanism 31 is held in the retracted position in a manner as will subsequently become clear, converter lens holder 28 having an arm 40 extending radially outwardly therefrom and rotatably mounted on the pivot pin 29 fast with the intermediate barrel 3 is held in the inoperative position, as shown by the solid line in FIG. 2, with the converter lens 27 consequently clear from the optical axis of the objective lens 1 in the objective lens assembly as shown in FIG. 5. In this condition, the camera as a whole operates under the standard mode in which only the objective lens 1 is utilized to form the image of the target object on the film. However, as the switching mechanism 31 pivots clockwise about the carrier rod 35, as viewed in FIG. 2, urged by the biasing spring 36, the engagement pin 37 tends to separate from the arm 40 of the objective lens holder 28. At this time, since the holder 28 is also urged clockwise, as viewed in FIG. 2, about the pivot pin 29 by the action of the torsion spring 30, the holder 28 pivots towards the operative position, shown by the chain line in FIG. 2, in a manner with the arm 40 constantly engaged to the engagement pin 37 then tending to separate away from the arm 40. When the switching mechanism 31 arrives at the release position shown by the chain line in FIG. 2, the converter lens 27 is brought into alignment with the objective lens 1 as shown in FIG. 4, in which condition the camera as a whole operate under the telephoto mode in which both of the objective lens 1 and the converter lens 27 are utilized to form the image of the target object on the film on a scale different from that under the standard mode, that is, a magnified scale in this instance.

It is the cam ring 5 that causes the switching mechanism 31 to move about the carrier rod 35 in the manner described hereinabove. For this purpose, as best shown in FIG. 2, the cam ring 5 has an-annular cam flange 5a integral therewith and protruding coaxial with the optical axis in a direction towards the camera body B. With the switching mechanism 31 biased by the biasing spring 36 clockwise about the carrier rod 35 so as to assume the release position, the cam follower roller 39 carried by the switching mechanism 31 is constantly held in contact with the outer periphery of the cam flange 5a. The cam flange 5a has a generally arcuate cam recess 5b defined therein so as to extend a predetermined angle, for example, about 180°, about the optical axis of the objective lens 1 with respective steps 41 and 42 defined at the circumferentially opposite ends of the cam recess 5b in cooperation with that of the remaining portion of the cam flange 5a. The cam recess 5b in the area in which the roller 39 operates, and the portion of the cam flange 5a where the cam recess 5b is defined has a wall thickness so varying that, as the cam ring 5 is rotated, for example, counterclockwise about the optical axis as viewed in FIG. 2, and the roller 39 contacting the cam flange 5a within the cam recess 5b while rotating about the bearing pin 38 subsequently moves past the point P, which may be angularly spaced about 120° from the step 41 about the optical axis, relative to the cam ring 5, the switching mechanism 31 can be caused to pivot counterclockwise about the carrier rod 35 from the release position, shown by the chain line, towards the retracted position, shown by the solid line, against the biasing spring 36, said switching mechanism 31 completely assuming the retracted position when the roller 39 having been moved relative to the cam ring 5 then rotating is brought into abutment with the step 42. In other words, at the portion of the cam recess 5b between the point P and the step 42 spaced about 60° from the point P, that portion of the cam flange 5a has a wall of a thickness gradually increasing towards the step 42 while the inner diameter of the cam ring coaxial with the optical axis remains the same over the entire circumference thereof.

During the counterclockwise pivot of the switching mechanism 31 so effected as hereinabove described, the engagement pin 37 contacting the arm 40 of the converter lens holder 28 pushes the holder 28 to pivot counterclockwise about the pivot pin 29 against the torsion spring 30, thereby causing the holder 28 to move from the operative position, shown by the chain line towards the inoperative position shown by the solid line.

The holder 28 has a stopper pin 43 having one end rigidly secured to the arm 40 and protruding therefrom towards the annular flange 3e of the intermediate barrel 3, said stopper pin 43 being engageable with an abutment member 44 for defining the operative position for the holder 28. The abutment member 44 is in the form of a generally elongated plate having at least two spaced slots 44a and 44b defined therein so as to extend in a direction parallel to the longitudinal axis thereof and is adjustably secured to the annular flange 3e of the intermediate barrel 3 by means of set screws 45a and 45b as best shown in FIG. 2. Although the abutment plate 44 is normally fixed in position with the set screws 45a and 45b tightly fastened, the position of the abutment plate 44 can be adjusted by loosening the set screws 45a and 45b so that, when the holder 28 is in the operative position with the stopper pin 43 contacting the abutment plate 44, the converter lens 27 can be exactly aligned with the optical axis of the objective lens 1.

As best shown in FIG. 2, the rocker arm 32 has a cam projection 32a formed integrally therewith at a position generally opposite to the engagement pin 37 and protruding generally upwardly for engagement with an intermediate lever 46 which is in turn operatively coupled to a switching lever 47. The intermediate lever 46 is supported in any suitable manner in the camera body B and is adapted to ride onto the cam projection 32a when the switching mechanism 31 is pivoted to the release position, as shown by the chain line, to bring the switching lever 47 in a lowered position, said switching lever 47 being, however, held in a raised position when and so long as the intermediate lever 46 does not rest on the cam projection 32a as shown by the solid line.

The switching lever 47b pivotally supported by the camera body B for movement between the raised and lowered positions is adapted to switch or change the picture frame in the camera rangefinder F according to the mode in which the camera is set, i.e., the telephoto mode or the standard mode. Specifically, when the switching lever 47 is in the lowered position, a narrow picture frame is displayed to the eye of a photographer looking into the rangefinder indicating that the converter 26 is utilized and, therefore, only a portion of the target object covered by the narrow picture frame can be shoot. On the other hand, when the switching lever 47 is in the raised position, a large picture frame is displayed to the photographer's eye indicating that only the objective lens 1 is utilized and, therefore, a portion of the target object covered by the large picture frame can be shoot. Since the rangefinder structure is well known and since the rangefinder structure disclosed in the previously described U.S. patent may be employed, the details thereof are not herein discussed for the sake of brevity.

From the foregoing, it has now become clear that, assuming that the camera as a whole is now set under the standard mode with the objective lens 1 held in the standard mode position substantially as shown in FIG. 2 and with the converter lens holder 28 held in the inoperative position, the rotation of the cam ring 5 in one direction clockwise about the optical axis as viewed in FIG. 2 results in the pivot of the switching mechanism 31 from the retracted position towards the release position and, at the same time, the intermediate barrel 3 is shifted leftwards as viewed in FIG. 2 together with the lens mount 2. During the continued clockwise rotation of the cam ring 5 and as the roller 39 is moved past the point P relative to the cam ring 5, the switching mechanism 31 is brought to the release position with the converter lens holder 28 consequently held in the operative position in alignment with the optical axis of the objective lens 1, while the intermediate barrel 3 is still moved forwards. At the time the roller 39 abuts the step 41, the objective lens 1 is shifted to the telephoto mode position as shown by the chain line in FIG. 1, with the camera as a whole consequently set under the telephoto mode.

It is to be noted that, during the pivotal movement of the converter lens holder 28 then moving together with the intermediate barrel 3 in the axial direction, the holder 28 located on one side of the camera front wall Ba opposite to the objective lens 1 moves partly through the opening Bb and partly through a recess Bc defined in the wall Ba in communication with the opening Bb, and at the time the roller 39 has moved past the point P, the holder 28 generally occupies the position which has previously been occupied by the objective lens 1 and within the lens assembly L as shown by the chain line in FIG. 1.

The reverse rotation of the cam ring 5 results in the operation generally reverse to that described above.

Although the present invention has fully been described in connection with the preferred embodiment thereof with reference to the accompanying drawings, it is to be noted that various changes and modifications are apparent to those skilled in the art. By way of example, depending on the optical characteristics or designs of the objective lens as well as the converter lens, and/or the pitch angle of the threads 3d and 4a, the switching between the standard mode and the telephoto mode can be accomplished merely by rotating the cam ring through the angle not more than 180°, for example, less than 90°.

In addition, although reference has been made to the use of the manipulatable knob K (FIG. 1) for rotating the cam ring 5, the use of a motor drive appears to be desirable in view of the advent of the age of full automatic cameras. In such case, the remaining portion of the cam flange 5a opposite to the cam recess 5b may be utilized and may have gear teeth for engagement of a motor-coupled gear.

Furthermore, although the converter has been described in the form of a telephoto converter, it may not limited thereto, but may be a wide-angle converter. In any event, it suffices that, when the converter is used, the lens system as a whole can have a focal length different from that established solely by the objective lens.

Accordingly, such changes and modifications are to be understood as included within the true scope of the present invention as defined by the appended claim, unless they depart therefrom.

What is claimed is:

1. A photographic camera comprising, in combination:
   a camera body including a front wall having an opening therein at a position opposed to a focal plane within the camera body where a photosensitive film, when loaded in the camera, is positioned;
   an objective lens assembly including an objective lens means providing a principal optical system of a first predetermined focal length and a lens mount means for supporting the objective lens means in alignment with the opening in the front wall of the camera body;
   a converter lens means carried by the lens mount means for movement together therewith in a direction parallel to the optical axis of the lens assembly;
   means for shifting the lens mount means in a direction parallel to the optical axis between a first mode position where the converter lens means is out of alignment with the objective lens assembly and a second mode position where the converter lens is aligned with the objective lens means; and
   means operatively engaging said shifting means for selectively switching the converter lens means into and out of alignment with the objective lens means when the object lens assembly is shifted to the second and first positions, respectively.

2. A camera as claimed in claim 1, wherein said shifting means include a cam ring mounted coaxially with the lens assembly and adapted to be rotated between first and second positions angularly spaced from each other about the optical axis, said cam ring when in the first position causing the lens mount means to move to the first mode position, and said cam ring being so shaped that, as said cam ring approaches the second position, the lens mount means is brought to the second mode position.

3. A camera as claimed in claim 2, wherein said switching means comprises a switching mechanism carried by the front wall for pivotal movement between retracted and release position and a spring biasing element urging the switching mechanism to release position, said switching mechanism, when the cam ring is rotated from the first position towards the second position and from the second position towards the first position, being pivoted from the retracted position towards the release position urged by the spring biasing element, and from the release position towards the retracted position against the spring biasing element, respectively.

4. A camera as claimed in claim 1, wherein said converter lens means is positioned between the objective lens assembly and the focal plane.

5. A photographic camera comprising, in combination:
   a camera body including a front wall having an opening therein at a position opposed to a focal plane within the camera body where a photosensitive film, when loaded in the camera, is positioned;
   an objective lens assembly including an objective lens means providing a principal optical system of a first predetermined focal length and a lens mount for supporting the objective lens assembly in alignment with the opening in the front wall of the camera body;
   an intermediate barrel threadingly mounted on the lens mount;
   a guide rod means rigidly connected to the camera body and extending in a direction parallel to the optical axis and operatively engaging said intermediate barrel for guiding the intermediate barrel so as to limit its movement to one only in a direction parallel to and along the optical axis of the objective lens assembly;
   a focus adjusting means for rotating the lens mount relative to the intermediate barrel for focus adjustment to focus an image of an object to be photographed on the focal plane;
   an outer barrel means for supporting the intermediate barrel on the camera body;
   an actuating barrel interposed between the outer barrel means and the intermediate barrel and operable to shift the intermediate barrel together with the lens mount in a direction parallel to the optical axis when rotated between first and second position;
   a converter lens means carried by said intermediate barrel at a position behind the objective and frontwardly of the focal plane for movement together therewith in a direction parallel to the optical axis of the lens assembly;
   means for rotating the actuating barrel, between first and second positions; and
   means for causing the converter lens means to move between an operative position, in which the converter lens is in alignment with the optical axis of the objective lens, and an inoperative position, in which the converter lens is out of alignment with the optical axis of the objective lens, in response to the rotation of the actuating barrel to said second and first positions, respectively.

* * * * *